No. 742,894. PATENTED NOV. 3, 1903.
W. H. McKENNA.
SIPHON FILLER.
APPLICATION FILED JAN. 5, 1903.
NO MODEL.

WITNESSES
INVENTOR
W. H. McKenna

No. 742,894.

Patented November 3, 1903.

UNITED STATES PATENT OFFICE.

WILLIAM H. McKENNA, OF PITTSBURG, PENNSYLVANIA, ASSIGNOR TO McKENNA BROTHERS BRASS COMPANY, LIMITED, OF PITTSBURG, PENNSYLVANIA, A PARTNERSHIP.

SIPHON-FILLER.

SPECIFICATION forming part of Letters Patent No. 742,894, dated November 3, 1903.

Application filed January 5, 1903. Serial No. 137,857. (No model.)

*To all whom it may concern:*

Be it known that I, WILLIAM H. McKENNA, of Pittsburg, Allegheny county, Pennsylvania, have invented a new and useful Siphon-Filler, of which the following is a full, clear, and exact description, reference being had to the accompanying drawings, forming part of this specification, in which—

Figure 1:
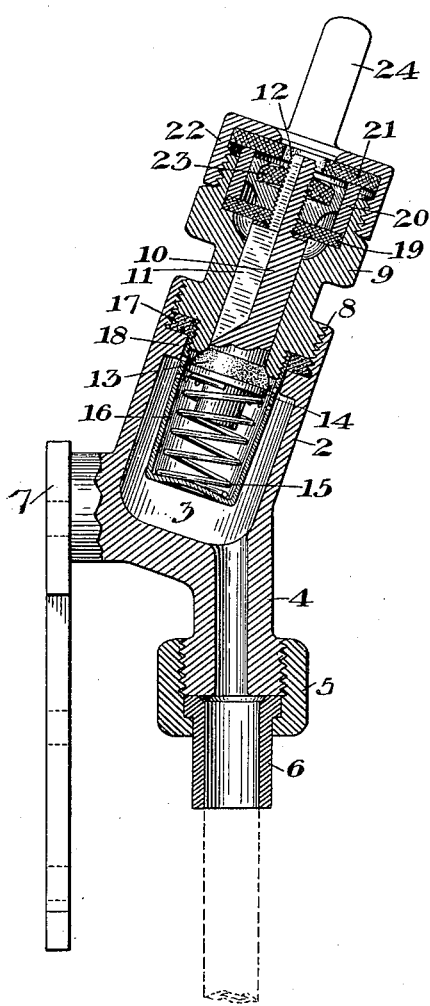
Figure 2:
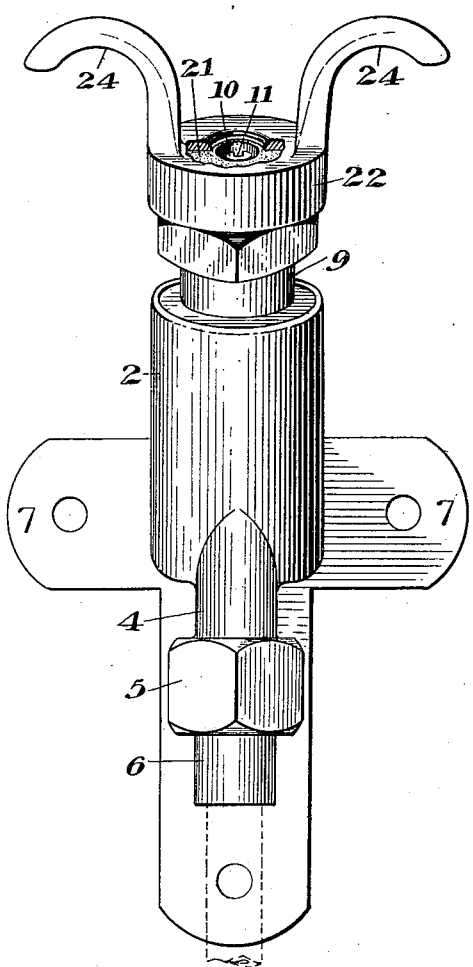

Figure 1 is a central vertical section of my improved filling device, and Fig. 2 is a front elevation of the same.

My invention relates to devices for filling siphons and similar articles with liquids under pressure; and the object of the invention is to provide a cheap and simple device of this character which will have few parts and not be liable to get out of order.

In the drawings, 2 represents the hollow head or casting inclosing the main chamber 3 of the device. A downwardly-extending neck 4 is preferably formed integral with the casting 2 and is provided with external screw-threads to be engaged by a coupling-sleeve 5, inclosing a section 6, within which the end of the supply-pipe (indicated in dotted lines) is secured.

The chamber 2 may be supported upon the bracket 7 secured to it, and the upper end of the head is internally screw-threaded at 8 to receive a hollow plug 9, with a cylindrical passage extending through it and containing a cylindrical valve-stem 10, which is grooved along one side, as shown at 11. This groove extends from the upper end of the stem, which is reduced in diameter and screw-threaded, as shown at 12, to near the lower end, where it is beveled or inclined outwardly and terminates above a conical rubber gasket 13, backed up by collar 14 on the stem. This collar and gasket form a valve, which is pressed against the beveled lower end of the hole through the plug 9, and this valve is normally held to its seat by a spiral spring 15, pressing against the lower face of the collar 14 and against the lower end of a perforated case 16, which is screwed around the valve-seat. A gasket 17 is pressed between an inner shoulder 18 of the chamber 2 and the plug 9 to seal the joint. The upper reduced and screw-threaded portion 12 of the valve-stem extends through a rubber diaphragm or gasket 19, which seats at the lower end of an enlarged upper chamber of the plug, with its edges held by a ring or collar 20, whose outer end presses against a gasket or rubber annulus 21, secured by a closing screw-plug 22, engaging outer screw-threads on the hollow plug 9. The upper end of the screw-threaded part 10 of the valve-stem extends through a screw-threaded button, within which is seated a small annular gasket 23, against which the end of the siphon-nozzle is pressed when it is forced through the hole in the gasket 21.

In order to assist the operator in forcing the siphon-nozzle in place, I preferably provide one or more hook-shaped finger-horns 24, which may be formed integrally with or to the plug 22.

In using the apparatus the siphon-nozzle is pressed through the opening in gasket 21 and against the gasket 23, and sufficient pressure is exerted to force back the lower valve until the groove in its stem opens into the perforated cage and the valve leaves its seat. The fluid under pressure will then flow through the case, through the groove-stem, and directly into the bottle. When the pressure is released by withdrawing the nozzle, the spring will force the valve to its seat, and the pressure will be shut off.

The advantages of the invention result from the simplicity of the device, the small number of parts, and the ease and cheapness of construction, and also from the efficiency of operation.

Variations may be made in the form and arrangement of the parts without departing from my invention.

I claim—

A siphon-filler having a chamber connected with a source of supply, said chamber being closed by a hollow plug containing an endwise-movable valve-stem with a valve at its lower end, an apertured cage surrounding the valve and containing a spring arranged to normally hold the valve closed, a chamber surrounding the upper reduced portion of the valve-stem and containing a transverse diaphragm, an upper gasket inclosing the reduced part of the stem, and a closing-cap having an inner annular gasket; substantially as described.

In testimony whereof I have hereunto set my hand.

WILLIAM H. McKENNA.

Witnesses:
L. M. REDMAN,
JOHN MILLER.